(12) United States Patent
Jin et al.

(10) Patent No.: US 11,803,796 B2
(45) Date of Patent: Oct. 31, 2023

(54) SYSTEM, METHOD, ELECTRONIC DEVICE, AND STORAGE MEDIUM FOR IDENTIFYING RISK EVENT BASED ON SOCIAL INFORMATION

(71) Applicant: PING AN TECHNOLOGY (SHENZHEN) CO., LTD., Shenzhen (CN)

(72) Inventors: Ge Jin, Shenzhen (CN); Liang Xu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 712 days.

(21) Appl. No.: 16/084,235

(22) PCT Filed: Jun. 30, 2017

(86) PCT No.: PCT/CN2017/091358
§ 371 (c)(1),
(2) Date: Apr. 21, 2021

(87) PCT Pub. No.: WO2018/201599
PCT Pub. Date: Nov. 8, 2018

(65) Prior Publication Data
US 2023/0186212 A1     Jun. 15, 2023

(30) Foreign Application Priority Data

May 5, 2017    (CN) ........................ 201710313184.0

(51) Int. Cl.
*G06F 40/279* (2020.01)
*G06Q 10/0635* (2023.01)
*G06Q 50/00* (2012.01)

(52) U.S. Cl.
CPC ....... *G06Q 10/0635* (2013.01); *G06F 40/279* (2020.01); *G06Q 50/01* (2013.01)

(58) Field of Classification Search
CPC .. G06Q 10/0635; G06Q 50/01; G06F 40/279; G06F 16/35; G06F 40/289; G06F 16/353
See application file for complete search history.

(56) References Cited

U.S. PATENT DOCUMENTS

2012/0221485 A1*   8/2012   Leidner ................. G06Q 40/08
                                                                            705/36 R
2013/0332460 A1* 12/2013   Pappas ................. G06F 16/951
                                                                             707/740

(Continued)

FOREIGN PATENT DOCUMENTS

CN         101201819 A     6/2008
CN         101266520 A     9/2008

(Continued)

OTHER PUBLICATIONS

European Search Report of European Patent Application No. 17897215.4 dated Mar. 25, 2020.

(Continued)

*Primary Examiner* — Abul K Azad

(57) ABSTRACT

The present disclosure provides a system, a method, an electronic device, and a storage medium for identifying risk event based on social information. The system includes an obtaining module configured for obtaining social information released by various predetermined social accounts from a predetermined social server; an analysis module, configured for analyzing the social information to obtain a company name and/or a product name contained in the social information; a resolution module configured for, after the company name and/or product name contained in the social information are obtained, resolving the social information to obtain key point information corresponding to the social (Continued)

information; and an identifying module configured for identifying an information directing classification corresponding to the key point information using a pre-trained classifier such that the social information corresponding to the predetermined information directing classification and the social account releasing the social information are sent to a predetermined terminal.

17 Claims, 4 Drawing Sheets

(56) References Cited

U.S. PATENT DOCUMENTS

| | | |
|---|---|---|
| 2015/0331847 A1 | 11/2015 | Jung et al. |
| 2016/0085869 A1 | 3/2016 | Magdy |
| 2016/0086280 A1 | 3/2016 | Okiyama et al. |

FOREIGN PATENT DOCUMENTS

| | | | | |
|---|---|---|---|---|
| CN | 101329666 A | | 12/2008 | |
| CN | 103593431 A | | 2/2014 | |
| CN | 104809109 A | | 7/2015 | |
| CN | 105138640 A | | 12/2015 | |
| CN | 105141607 A | | 12/2015 | |
| CN | 105183793 A | | 12/2015 | |
| CN | 107545505 A | * | 1/2018 | |
| JP | 2016212643 A | | 12/2016 | |
| KR | 20140012469 A | | 2/2014 | |
| KR | 101409413 B1 | | 6/2014 | |
| KR | 101561464 B1 | | 10/2015 | |
| KR | 20150130214 A | | 11/2015 | |
| KR | 20160143491 A | | 12/2016 | |
| WO | WO-2015015656 A1 | * | 2/2015 | ......... G01C 21/3617 |

OTHER PUBLICATIONS

Examination report of counterpart Indian Patent Application No. 201947006316 dated Feb. 10, 2021.

* cited by examiner

SYSTEM, METHOD, ELECTRONIC DEVICE, AND STORAGE MEDIUM FOR IDENTIFYING RISK EVENT BASED ON SOCIAL INFORMATION

The present application claims the benefit of Chinese Application No. 2017103131840, entitled "system and method for identifying risk event based on social information" filed on May 05, 2017, the entire content of which is incorporated herein in its entirety.

TECHNICAL FIELD

The present disclosure relates to financial technologies, and more particularly, to a system, a method, an electronic device, and a computer-readable storage medium for identifying risk event based on social information.

BACKGROUND

With the increasing development of the mobile Internet technology, financial practitioners like insurance salesmen or financial management salesmen generally recommend insurance products or financial managing products to clients through social networks. Thus, a large amount of financial information is rapidly and widely spread on Internet. Some insurance salesmen or financial management salesmen may propaganda negative information to clients. In addition, some clients may express negative information on Internet to other potential clients when feeling being treated unfairly at the purchase of insurance products or financial managing products (which may be actually caused by irregularities from some insurance salesman), resulting in a series of problems including loses of clients of the financial company.

Although there are some technical solutions for identifying network information, these solutions cannot accurately and effectively identify the negative information contained in the information spread on social networks, resulting in financial risk events.

SUMMARY OF THE DISCLOSURE

The present disclosure provides a system, a method, an electronic device, and a computer-readable storage medium for identifying risk event based on social information which are capable of accurately and effectively identifying whether the social information is negative information and thus avoiding risk events.

According to a first aspect of the present disclosure, a system for identifying risk event based on social information is provided, including:

an obtaining module configured for obtaining social information released by various predetermined social accounts from a predetermined social server;

an analysis module, configured for analyzing the social information to obtain a company name and/or a product name contained in the social information;

a resolution module configured for, after the company name and/or product name contained in the social information are obtained, resolving the social information to obtain key point information corresponding to the social information; and an identifying module configured for identifying an information directing classification corresponding to the key point information using a pre-trained classifier such that the social information corresponding to the predetermined information directing classification and the social account releasing the social information are sent to a predetermined terminal for reviewing.

According to a second aspect of the present disclosure, an electronic device is provided; the electronic device includes a storage medium and a processor connected to the storage medium, the storage medium stores a system for identifying risk event based on social information which can be executed by the processor to perform following steps:

S1, obtaining social information released by various predetermined social accounts from a predetermined social server;

S2, analyzing the social information to obtain a company name and/or a product name contained in the social information;

S3, resolving the social information to obtain key point information corresponding to the social information after the company name and/or product name are obtained; and S4, identifying an information directing classification corresponding to the keypoint information using a pre-trained classifier such that the social information corresponding to the predetermined information directing classification and the social account releasing the social information are sent to a predetermined terminal for reviewing.

According to a third aspect of the present disclosure, a method for identifying risk event based on social information, including:

S1, obtaining social information released by various predetermined social accounts from a predetermined social server;

S2, analyzing the social information to obtain a company name and/or a product name contained in the social information;

S3, resolving the social information to obtain key point information after the company name and/or the product name contained in the social information is obtained; and S4, identifying an information directing classification corresponding to the key point information using a pre-trained classifier, and thus sending the social information having a predetermined information directing classification and the social account releasing the social information to a predetermined terminal for reviewing.

According to a fourth aspect of the present disclosure, a computer-readable storage medium with a system for identifying risk event based on social information stored thereon, which, when being executed by one or more processors, is capable of performing the steps of the above method is provided.

The present disclosure obtains the social information released by various social accounts from the social server, analyzes the social information to obtain the company name and/or the product name contained in the social information, resolves the social information to obtain the key point information corresponding to the social information, identifies the information directing classification corresponding to the key point information using the classifier, and sends the social information having the predetermined information directing classification to the predetermined terminal for reviewing. Since the social information is at first analyzed to obtain the company name and/or the product name and then is resolved to obtain the key point information contained in the social information, thus, the key point of the social information can be identified accurately and effectively. Therefore, whether the social information is negative information or not can be identified to control the releasing of negative information on social networks, thus, risk events can be avoided.

PREFERRED EMBODIMENTS

For clearly understanding technical features, purpose, and effect of the present disclosure, embodiments are given in detail hereinafter with reference to the accompanying drawings.

Figure 1:
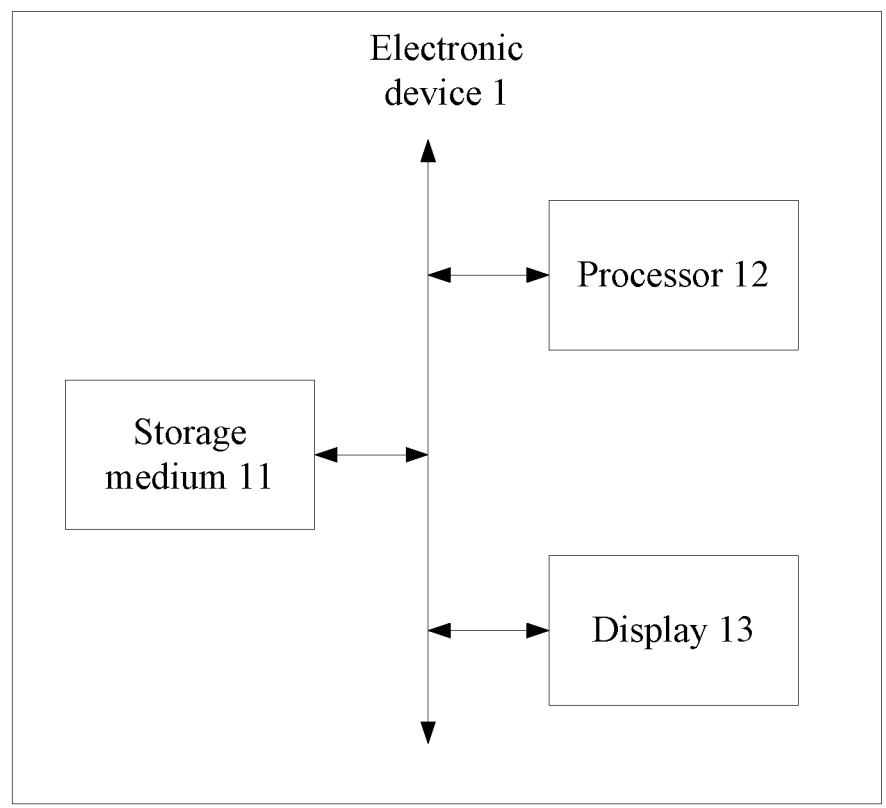
FIG. 1 is a schematic view showing a hardware structure of an electronic device in accordance with an embodiment of the present disclosure.

FIG. 1 shows a hardware structure of an electronic device in accordance with an embodiment of the present disclosure.

The electronic device 1 can be one capable of performing numerical calculation and/or information processing automatically according to preset or pre-stored instructions. In some embodiments, the electronic device 1 can be a computer, a single network server, a server group having multiple network servers or a cloud server formed by a large number of host machines or network servers. Cloud computing is one type of distributed computing, referring to a super virtual computer formed by a group of discrete computers which are coupled together.

In some embodiments, the electronic device 1 may include but not limited to a storage medium 11, a processor 12, and a display 13. FIG. 1 exemplarily illustrates the electronic device 1 with components 11-13. However, it is understood that in other embodiments the electronic device 1 may include more or less components.

The storage medium 11 is configured for storing applications installed in the electronic device 1 and various types of data of the electronic device 1, for example, program instructions of a system for identifying risk events based on social information. The storage medium 11 can also be configured for temporarily storing data which has been outputted or is to be outputted. In some embodiments, the storage medium 11 can be an internal storage unit of the electronic device 1 such as a disk or an internal memory of the electronic device 1. In other embodiments, the storage medium 11 can be an external storage device such as a pluggable hard disk, a smart media card, a secure digital card, or a flash card configured in the electronic device 1. In some embodiments, the storage medium 11 may include both the internal storage unit and the external storage device.

The processor 12 is configured for executing the program instructions stored in the storage medium 11 or processing data, for example, executing a system for identifying risk event based on social information. In some embodiments, the processor 12 can be a central processing unit, a microprocessor, or other digital processors.

The display 13 is configured for displaying the data processed in the electronic device 1 and a visualized user interface such as a risk event identifying interface. In some embodiments, the display 13 may be a LED display, a liquid crystal display, a touch sensitive liquid crystal display, or an OLED touch sensitive display, etc. The storage medium 11, the processor 12, and the display 13 communicate with each other through a bus system of the electronic device 1.

The system for identifying risk event based on social information is stored in the storage medium 11, including at least one computer-readable instruction. The at least one computer-readable instruction is executed by the processor 12 to perform the method of different embodiments of the present disclosure. Based on different functions of different blocks of the at least one computer-readable instruction, the at least one computer-readable instruction can be divided into one or more modules.

Figure 2:
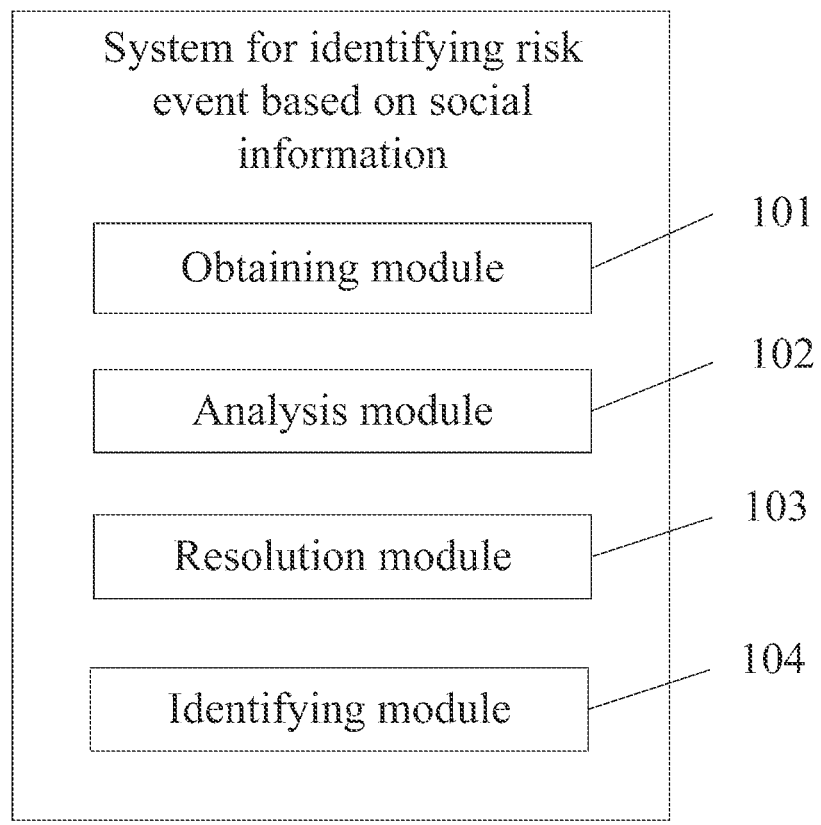
FIG. 2 is a block functional diagram of a system for identifying risk event based on social information in accordance with an embodiment of the present disclosure.

Referring to FIG. 2, which is a block functional diagram of a system for identifying risk event based on social information in accordance with an embodiment of the present disclosure, the system for identifying risk event based on social information includes one or more modules. The one or more modules are stored in the storage medium 11 and are executed by one or more processors (e.g., the processor 12 in the embodiment). For example, in FIG. 2, the system for identifying risk event based on social information includes an obtaining module 101, an analysis module 102, a resolution module 103, and an identifying module 104. The module referred in the present disclosure includes a series of computer program instructions for realizing a predetermined function which are more suitable than the program to describe the execution of the system for identifying risk event based on social information in the electronic device 1.

The obtaining module 101 is configured for obtaining social information released by various predetermined social accounts from a predetermined social server.

The predetermined social server may be a micro blog server, a wetchat server, or a QQ server. The social accounts correspond to the social server, for example, the accounts can be micro blog accounts, wetchat accounts, or QQ accounts. For a certain social server, the predetermined social accounts may be some social accounts or all social accounts corresponding to the social server. When a user releases social information using his or her own account, for example, an insurance sales man A releases social information "PingAn has provided Zunhong Life product" in the friend circle or a certain friend chat group using his or her own wetchat account.

In the embodiment, the system for identifying risk event based on social information can obtain the latest social information by obtaining social information released by various predetermined social accounts from the social server in real time. Optionally, the system can obtain the social information at regular times, which is capable of reducing the burden of the system compared with the way of obtaining social information in real time.

The analysis module 102 is configured for analyzing the social information to obtain a company name and/or a product name contained in the social information.

In the embodiment, the social information released by each social account is analyzed to obtain the company name and/ or product name contained in the social information. For example, the social information "PingAn has provided Zunhong Life product" stated above is analyzed, and the company name "Pingan" and the product name "Zunhong Life" are obtained through the analysis. While for the social information "Travel to a tourist attraction named "*" today", no company names and/or product names are obtained after the information is analyzed.

During the process of analyzing the social information, the information can be analyzed one piece by one piece according to the time order in which the information is released. In some embodiments, one piece of social information can be divided into characters and/or words, and the obtained characters and/or words are matched with characters and/or words pre-stored in a predetermined word library to obtain the company name and/or the product name contained therein. In other embodiments, after the social information is divided into characters and/or words, nouns are selected from the characters and/or words to be matched with nouns pre-stored in a predetermined noun library, thereby obtaining the company name and/or the product name contained in the social information. If no company names and/or product names are obtained from the piece of social information, the piece of social information is not processed and the analysis goes on to the next piece of social information to determine whether any company name and/or product name is contained.

By analyzing whether the piece of social information contains the company name and/or the product name, whether the piece of social information contains a view point corresponding to the company name and/or the product name or not can be further determined.

The resolution module 103 is configured for resolving the social information to obtain key point information after the company name and/or the product name contained in the social information is obtained.

In some embodiments, the piece of social information containing the company name and/or product name is resolved to obtain the key point information contained therein. The key point information can be opinions or points corresponding to the company name and/or product name.

In some embodiments, during the resolution of the social information, if the social information contains the company name and/or the product name, the characters and/or the words having predetermined parts of speech can be extracted from the social information, for example, after the social information is divided into characters and/or words, the characters and/or words having predetermined parts of speech, such as adjectives, verbs, nouns, or auxiliaries, are extracted from the social information, and the extracted characters and/or words having the predetermined parts of speech are analyzed to obtain the keypoint information corresponding to the social information. For example, for the social information "Pingan has provided Zunhong Life product, Zunhong Life product is safe and has a high profit", the word "safe" and "high" are adjectives, and the keypoint information is "Zunhong Life product is safe and has a high profit". In other embodiments, the social information which is divided into characters and/or words is analyzed to determine whether the social information contains any negative character and/or word. For example, the social information is analyzed to determine whether any negative character and/or word is contained therein, thereby obtaining the key point information corresponding to the social information.

The identifying module 104 is configured for identifying an information directing classification corresponding to the key point information using a pre-trained classifier, and thus sending the social information having a predetermined information directing classification and the social account releasing the social information to a predetermined terminal for reviewing.

The pre-trained classifier can be a support vector classifier, and the information directing classification corresponding to the key point information may include positive information and negative information. In some embodiments, the system for identifying risk events based on social information further includes a training module for training the support vector classifier. The training module is configured for obtaining a preset number (e.g. 10 thousands) of key point information samples of positive information(for example, the sample may be "Pingan Health Insurance has a wide coverage" or "Pingan Auto Insurance is a big brand fast in claim settlement") and a preset number of key point information samples of negative information (for example, the sample can be "Pingan Auto Insurance claims slow and poor service" or "Pingan Wealth management products are not as high as promised"); dividing all the keypoint information samples into a training set of a first preset ratio (e.g., 70%) and a testing set of a second preset ratio (e.g., 30%), wherein the sum of the first ratio and the second ratio is less than or equal to 1; training a predetermined support vector classifier using the training set (at the first training, the support vector classifier can be trained with parameters having default values), and testing an accuracy of the trained support vector classifier using the testing set; if the accuracy (e.g., 0.99) is greater than or equal to a preset accuracy (e.g., 0.98), ending the training; otherwise, if the accuracy (e.g., 0.95) is less than the preset accuracy, increasing the number of the key point information samples of both positive information and negative information and repeating the training of the support vector classifier.

After the classifier identifies the information directing classification corresponding to key point information, if the information directing classification is negative information, the classifier sends the corresponding social information and the social account releasing the social information to the predetermined terminal for reviewing. If the social information is confirmed as being negative information, measures may be taken to the social account to control the releasing of the social information. For example, reminding information maybe sent to the social account to remind the user of the social account not to release negative information; or, prompt information of irregular operations may be sent to the user of the social account.

The system of the present disclosure obtains the social information released by various social accounts from the social server, analyzes the social information to obtain the company name and/or the product name contained in the social information, resolves the social information to obtain the key point information corresponding to the social information, identifies the information directing classification corresponding to the key point information using the classifier, and sends the social information having the predetermined information directing classification(for example, negative information)to the predetermined terminal for reviewing. Since the social information is at first analyzed to obtain the company name and/or the product name and then is resolved to obtain the key point information contained in the social information, thus, the key point of the social information can be accurately and effectively identified. Therefore, whether the social information is negative information or not can be identified accurately and effectively to control the releasing of negative information on social networks, thus, risk events can be avoided.

Figure 3:
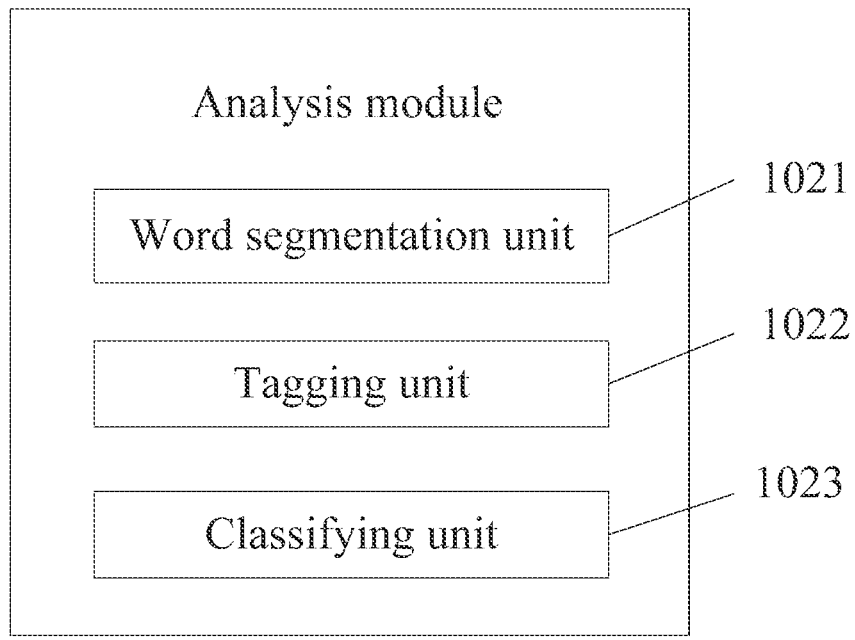
FIG. 3 is a schematic view of an analysis module of FIG. 2 in accordance with an embodiment of the present disclosure.

Referring to FIG. 3, based on the embodiment of FIG. 2, the analysis module 102 of an embodiment includes a word segmentation unit 1021, a tagging unit 1022, and a classifying unit 1023. The word segmentation unit 1021 is configured for performing word segmentation to the social information according to a predetermined word segmentation rule to obtain corresponding segmented words. The segmented words include characters and words, for example, segmented words including "Pingan", "provided", "has", "Zunhong Life", and "product" are obtained from after word segmentation is performed to the social information "Pingan has provided Zunhong Life product".

In some embodiments, the predetermined word segmentation rule includes dividing the social information into short sentences according to predetermined types of punctuations and performing word segmentation to the obtained short sentences based on a long term priority principle. For example, the social information is divided into short sentences according to punctuations including ",", "。", "!", and ";"; the part of the social information located between the first character and the first punctuation is a short sentence; if there are no punctuations at the end of the social information, the part of the social information located between the last punctuation and the last character of the social information is a short sentence; if there is a punctuation at the end of the social information, the part of the social information located between every two adjacent punctuations is a short sentence.

Word segmentation is performed to each obtained short sentence based on the long term priority principle. During the word segmentation, for a short sentence T1, if the first character of T1 is A, a longest word X1 is acquired from a predetermined word library started with the character A, then X1 is eliminated from T1 and the remaining part of T1 is defined to be T2; T2 is analyzed in the same way as T1 and so on to obtain the result "X1/X2/ . . . ". For example, for the social information "Pingan has provided Zunhong Life product", if words "Pingan", "provided", "has", "Zunhong Life", and "product" are obtained from a predetermined word library, then the word segmentation result of the social information is: "Pingan", "provided", "has", "Zunhong Life", and "product".

The tagging unit 1022 is configured for tagging each segmented word with a corresponding part of speech according to a predetermined part-of-speech tagging rule. For example, the parts of speech of the segmented words can be as follows: "Pingan/noun", "provided/verb", "has/auxiliary", "Zunhong Life /noun", and "product/noun".

In some embodiments, the predetermined part-of-speech tagging rule is: according to a mapping between a character and a corresponding part of speech and a mapping between a word and a corresponding part of speech in a general word dictionary library (for example, in a general word dictionary library, a part of speech of "playground" is noun), and/or, according to a predetermined mapping between a character and a corresponding part of speech and a predetermined mapping between a word and a corresponding part of speech (for example, according to the predetermined mappings, the part of speech corresponding to "playground" is common noun), determining the part of speech corresponding to each segmented word, and tagging each segmented word with the corresponding part of speech. In some embodiments, the part-of-speech tagging can be carried out according to the mappings in a general word dictionary library; in some embodiments, the part-of-speech tagging can be performed according to the predetermined mappings; in other embodiments, the part-of-speech tagging can be performed according to both the mappings in a general word dictionary library and the predetermined mappings (the predetermined mapping is prior to the mapping in a general word dictionary library, for example, if the part of speech corresponding to "playground" in a general word dictionary library is noun, and the part of speech corresponding to "playground" is common noun according to the predetermined mappings, then the part of speech of "playground" is tagged as common noun).

Each segmented word is tagged with the corresponding part of speech, for example, auxiliaries in each segmented word are identified according to a pre-stored auxiliary library (e.g., the auxiliary in Chinese including "have/has/had", "lai", "zhe", "guo", "of", "di", "de", "similar", and "suo", etc.), and the part of speech of the identified auxiliary is tagged as auxiliary; adjectives in each segmented word are identified according to a predetermined adjective library (e.g., the adjectives in Chinese including "very safe", "Capital-preserving", "highly profitable", and "Long cycle", etc.); and verbs in each segmented word are identified according to a pre-stored verb library (e.g., the verbs in Chinese including "provide", "provided", "release", "released", "develop", and "sell", etc.), and the part of speech of the identified verb word is tagged as verb.

The classifying unit 1023 is configured for classifying the segmented word having a part of speech being noun (e.g., a person name, a place name, a company name, a product name, and other nouns) according to a predetermined classification rule, and obtaining the company name and/or the product name contained in the social information according to the classification result.

In some embodiments, the predetermined classification rule can be: identifying the segmented word having a part of speech tagged as noun using a pre-trained identification model, and classifying the segmented words having parts of speech respectively tagged into different classifications. In some embodiments, the identification model can be a random field model.

The training of the random filed model includes steps as follows.

Firstly, construction of a training data set: constructing a training data set by a predetermined data set format of short sentence (for example, the format may be "{{company_name: Pingan}} has provided {{product_name: Zunhong Life}} product").

Secondly, construction of feature variables: extracting feature variables of each segmented word corresponding to each training data set (for example, the extracted feature variables include but not limited to a part of speech, context information, a structure of the word), and converting unstructured data into a structured data feature matrix. Take the social information "Pingan has provided Zunhong Life product" as an example, the feature matrix is exemplarily illustrated in table One as below.

TABLE ONE

| Segmented word | Part of speech | Preposition | Postposition | containing "Pingan" |
|---|---|---|---|---|
| Pingan | noun | Null | provided | True |
| provided | verb | Pingan | has | False |
| has | auxiliary | provided | Zunhong Life | False |
| Zunhong Life | noun | has | product | False |
| product | noun | Zunhong Life | 。 | False |
| 。 | punctuation | product | Null | False |

Thirdly, training of the model: training the random field model with the constructed feature variables as input variables, and using the trained random field model as the model for identifying the noun classification, outputting the nouns of various classifications, for example, the nouns in the classification of people name, the nouns in the classification of company name, the nouns in the classification of product name, etc., and obtaining the nouns in the classifications of company name and product name from the outputting result.

In other embodiments, after the part-of-speech tagging of the segmented words, predetermined verbs such as "provide", "provided", "release", "released", "develop", and "sell" can be obtained, and nouns following theses verbs can be classified into the same classification from which nouns representing the company name and/or the product name can be obtained.

Figure 4:
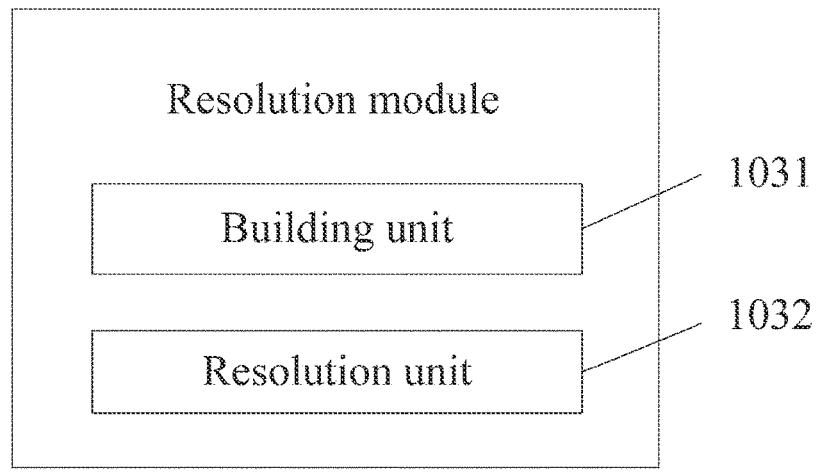
FIG. 4 is a schematic view of a resolution module of FIG. 2 in accordance with an embodiment of the present disclosure.

In an embodiment, based on the embodiment of FIG. 3, the resolution module 103 of the embodiment shown in FIG. 4 further includes a building unit 1031 and a resolution unit 1032.

The building unit 1031 is configured for, after the company name and/or the product name contained in the social information are obtained, building a predetermined word segmentation tree according to an order and parts of speech of the segmented words of the social information.

Figure 5:
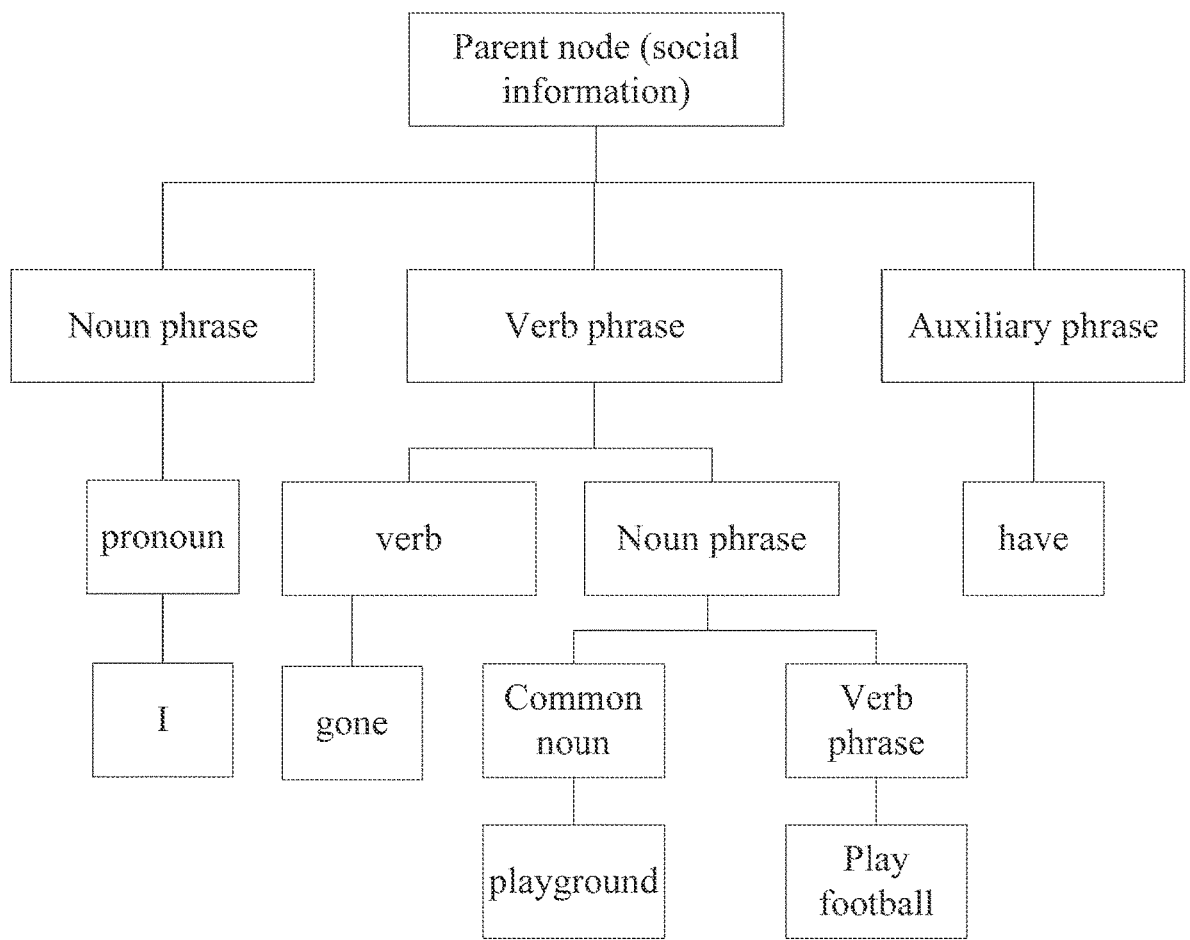
FIG. 5 is a schematic view of a predetermined word segmentation tree in accordance with an embodiment of the present disclosure.

As shown in FIG. 5, the predetermined word segmentation tree includes multiple levels of nodes; a node of a first level is the social information, nodes of a second level are segmented phrases (e.g., noun phrases, verb phrases) obtained by dividing the social information according to the order and the parts of speech of the segmented words of the social information, the nodes of each following level behind the second level are obtained by dividing the segmented phrases of the previous level according to parts of speech of the segmented words. During the process, if a segmented phrase cannot be divided furthermore, the segmented phrase is the node of the last level of the corresponding node branch. Taking the social information "I have gone to a playground to play football" as an example, the predetermined word segmentation tree is as shown in FIG. 5.

The resolution unit 1032 is configured for resolving the key point information corresponding to the social information based on the predetermined word segmentation tree.

The key point information can be obtained by calculating a node distance, that is, a number of nodes between a segmented word having a first predetermined part of speech (e.g., noun) and a segmented word having a second predetermined part of speech (e.g., verb or adjective), acquiring the segmented word having the second predetermined part of speech which has the shortest node distance from the segmented word having the first predetermined part of speech, and forming the key point information according to the order of the two segmented words in the social information.

Figure 6:
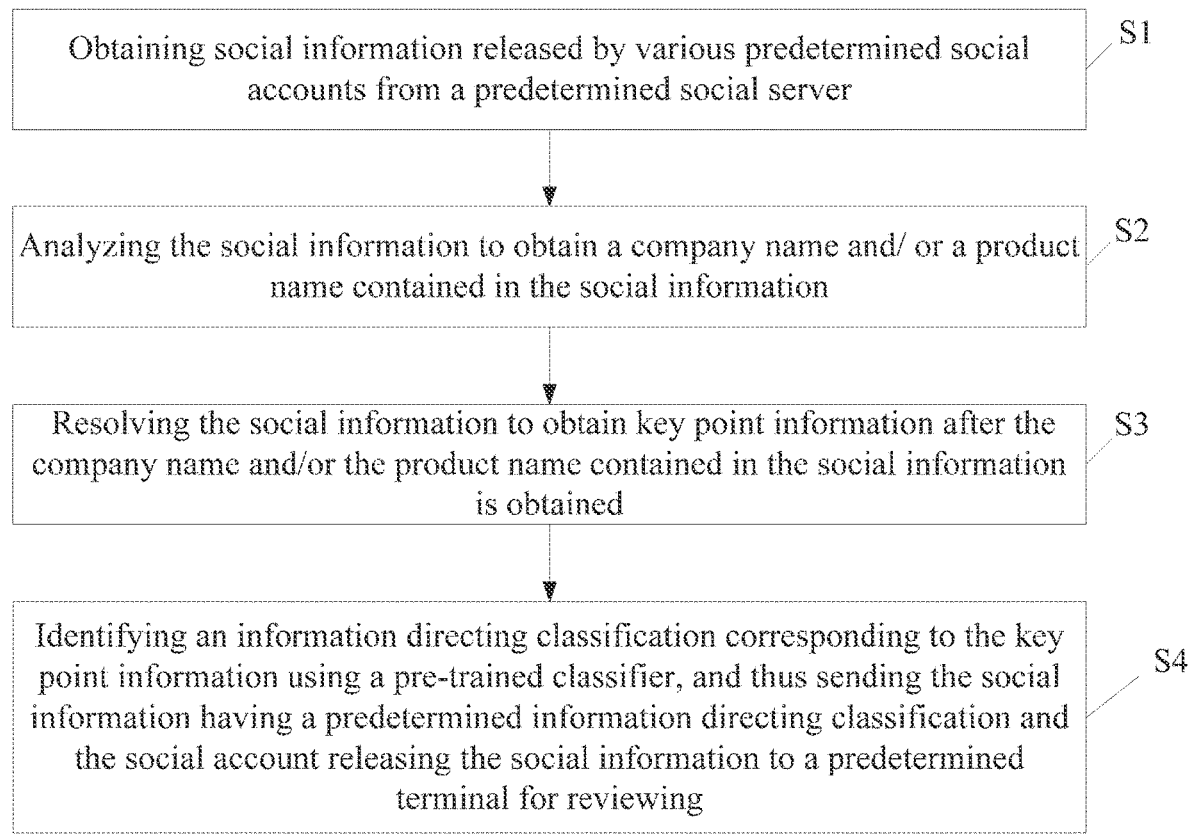
FIG. 6 is a flow chart illustrating processes of a method for identifying risk event based on social information in accordance with an embodiment of the present disclosure.

Referring to FIG. 6, which is a flow chart illustrating processes of a method for identifying risk event based on social information in accordance with an embodiment of the present disclosure, the method for identifying risk event based on social information can be executed by a system for identifying risk event based on social information. The system can be integrated in a server and implemented by software and/or hardware. The method for identifying risk event based on social information includes steps as follows.

Step S1, obtaining social information released by various predetermined social accounts from a predetermined social server.

The predetermined social server may be a micro blog server, a wetchat server, or a QQ server. The social accounts correspond to the social server, for example, the accounts can be micro blog accounts, wetchat accounts, or QQ accounts. For a certain social server, the predetermined social accounts may be some social accounts or all social accounts corresponding to the social server. When a user releases social information using his or her own account, for example, an insurance sales man A releases social information "Pingan has provided Zunhong Life product" in the friend circle or a certain friend chat group using his or her own wetchat account.

In the embodiment, the system for identifying risk event based on social information can obtain the latest social information by obtaining social information released by various predetermined social accounts from the social server in real time. Optionally, the system can obtain the social information at regular times, which is capable of reducing the burden of the system compared with the way of obtaining social information in real time.

Step S2, analyzing the social information to obtain a company name and/or a product name contained in the social information.

In the embodiment, the social information released by each social account is analyzed to obtain the company name and/or the product name contained in the social information. For example, the social information "Pingan has provided Zunhong Life product" stated above is analyzed, and the company name "Pingan" and the product name "Zunhong Life" are obtained through the analysis. While for the social information "Travel to a tourist attraction named "*" today", no company names and/or product names are obtained after the information is analyzed.

During the process of analyzing the social information, the information can be analyzed one piece by one piece according to the time order in which the information is released. In some embodiments, one piece of social information can be divided into characters and/or words, and the obtained characters and/or words are matched with characters and/or words pre-stored in a predetermined word library to obtain the company name and/or the product name contained therein. In other embodiments, after the social information is divided into characters and/or words, nouns are selected from the characters and/or words to be matched with nouns pre-stored in a predetermined noun library, thereby obtaining the company name and/or the product name contained in the social information. If no company names and/or product names are obtained from the piece of social information, the piece of social information is not processed and the analysis goes on to the next piece of social information to determine whether any company name and/or product name is contained.

By analyzing whether the piece of social information contains the company name and/or the product name, whether the piece of social information contains a view point corresponding to the company name and/or the product name or not can be further determined.

Step S3, resolving the social information to obtain key point information after the company name and/or the product name contained in the social information is obtained.

In some embodiments, the piece of social information containing the company name and/or product name is resolved to obtain the key point information contained therein. The key point information can be opinions or points corresponding to the company name and/or product name.

In some embodiments, during the resolution of the social information, if the social information contains the company name and/or the product name, the characters and/or the words having predetermined parts of speech can be extracted from the social information, for example, after the social information is divided into characters and/or words, the characters and/or words having predetermined parts of speech, such as adjectives, verbs, nouns, or auxiliaries, are extracted from the social information, and the extracted characters and/or words having the predetermined parts of speech are analyzed to obtain the key point information corresponding to the social information. For example, for the social information "Pingan has provided Zunhong Life product, Zunhong Life product is safe and has a high profit", the words "safe" and "high" are adjectives, and the keypoint information is "Zunhong Life product is safe and has a high profit". In other embodiments, the social information which is divided into characters and/or words is analyzed to determine whether the social information contains any negative character and/or word. For example, the social information is analyzed to determine whether any negative character and/or word is contained therein, thereby obtaining the key point information corresponding to the social information.

Step S4, identifying an information directing classification corresponding to the key point information using a pre-trained classifier, and thus sending the social information having a predetermined information directing classification and the social account releasing the social information to a predetermined terminal for reviewing.

The pre-trained classifier can be a support vector classifier, and the information directing classification corresponding to the key point information may include positive information and negative information. After the classifier identifies the information directing classification corresponding to key point information, if the information directing classification is negative information, the classifier sends the corresponding social information and the social account releasing the social information to the predetermined terminal for reviewing. If the social information is confirmed as being negative information, measures may be taken to the social account to control the releasing of the social information. For example, reminding information may be sent to the social account to remind the user of the social account not to release negative information; or, prompt information of irregular operations may be sent to the user of the social account.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. An electronic device, comprising a storage medium and a processor connected to the storage medium, the storage medium storing a system for identifying risk event based on social information which can be executed by the processor to perform following steps:

S1, obtaining social information released by various predetermined social accounts from a predetermined social server;

S2, analyzing the social information to obtain a company name and/or a product name contained in the social information;

S3, resolving the social information to obtain key point information corresponding to the social information after the company name and/or product name are obtained; and S4, identifying an information directing classification corresponding to the key point information using a pre-trained classifier such that the social information corresponding to the predetermined information directing classification and the social account releasing the social information are sent to a predetermined terminal for reviewing, wherein the information directing classification comprises positive information and negative information, the classifier is a support vector classifier, and the system for identifying risk events based on social information can be executed by the processor to further perform following steps:

obtaining a preset number of key point information samples of positive information and a preset number of key point information samples of negative information;

dividing all the key point information samples into a training set of a first ratio and a testing set of a second ratio;

training a predetermined support vector classifier using the training set and testing an accuracy of the trained support vector classifier using the testing set;

if the accuracy is greater than a preset accuracy, ending the training and using the trained support vector classifier as the classifier, otherwise, if the accuracy is less than the preset accuracy, increasing the number of the key point information samples of the positive information and the negative information respectively to repeat the training.

2. The electronic device of claim 1, wherein the step S2 comprises:

performing word segmentation to the social information to obtain corresponding segmented words according to a predetermined word segmentation rule;

tagging parts of speech of the segmented words according to a predetermined part-of-speech tagging rule; and classifying the segmented word with a part of speech being noun to obtain the company name and/or the product name from the social information according to the classifying result.

3. The electronic device of claim 2, wherein the predetermined word segmentation rule comprises:

segmenting the social information into short sentences according to predetermined types of punctuations and segmenting the short sentences based on a long term priority principle.

4. The electronic device of claim 3, wherein the predetermined part-of-speech tagging rule comprises:

determining and tagging a part of speech of each segmented word according to a mapping between a mapping between a character and a corresponding part of speech and a mapping between a speech and a corresponding part of speech in a general word dictionary library, and/or to a predetermined mapping relationship between a word and a corresponding part of speech and a predetermined mapping relationship between a word and a corresponding part of speech.

5. The electronic device of claim 4, wherein the predetermined word segmentation rule comprises identifying the segmented word having a part of speech tagged as noun using a pre-trained identification model such that the segmented words having parts of speech tagged as noun can be classified, wherein the identifying model is a conditional random field model.

6. The electronic device of claim 3, wherein the step S3 comprises:

after the company name and/or product name contained in the social information are obtained, building a predetermined word segmentation tree according to an order and parts of speech of the segmented words of the social information and resolving the key point information corresponding to the social information based on the predetermined word segmentation tree.

7. The electronic device of claim 6, wherein the predetermined word segmentation tree comprises multiple levels of nodes; a node of a first level corresponds to the social information, nodes of a second level correspond to segmented phrases of the social information obtained by segmenting the social information according to the order and parts of speech of the segmented words, and nodes of each following level behind the second level are obtained by dividing the segmented phrases of the previous level.

8. The electronic device of claim 7, wherein the step S3 further comprises:

obtaining a node distance between a segmented word of a first predetermined part of speech and a segmented word of a second predetermined part of speech based on the predetermined word segmentation tree, obtaining a segmented word of the second predetermined part of speech having a shortest node distance from the segmented word of the first predetermined part of speech, and forming the key point information by the segmented word of the first predetermined part of speech and the obtained segmented word of the second predetermined part of speech according to the order thereof in the social information.

9. A method for identifying risk event based on social information, comprising:

S1, obtaining social information released by various predetermined social accounts from a predetermined social server;

S2, analyzing the social information to obtain a company name and/or a product name contained in the social information;

S3, resolving the social information to obtain key point information after the company name and/or the product name contained in the social information is obtained; and S4, identifying an information directing classification corresponding to the key point information using a pre-trained classifier, and thus sending the social information having a predetermined information directing classification and the social account releasing the social information to a predetermined terminal for reviewing, wherein the information directing classification comprises positive information and negative information, the classifier is a support vector classifier, and the method further comprises:

obtaining a preset number of key point information samples of positive information and a preset number of key point information samples of negative information;

dividing all the key point information samples into a training set of a first ratio and a testing set of a second ratio;

training a predetermined support vector classifier using the training set and testing an accuracy of the trained support vector classifier using the testing set;

if the accuracy is greater than a preset accuracy, ending the training and using the trained support vector classifier as the classifier, otherwise, if the accuracy is less than the preset accuracy, increasing the number of the key point information samples of the positive information and the negative information respectively to repeat the training.

10. The method of claim 9, wherein the step S2 comprises:

performing word segmentation to the social information to obtain corresponding segmented words according to a predetermined word segmentation rule;

tagging parts of speech of the segmented words according to a predetermined part-of-speech tagging rule; and classifying the segmented word with a part of speech being noun to obtain the company name and/or the product name from the social information according to the classifying result.

11. The method of claim 10, wherein the predetermined word segmentation rule comprises:

segmenting the social information into short sentences according to predetermined types of punctuations and segmenting the short sentences based on a long term priority principle.

12. The method of claim 11, wherein the predetermined part-of-speech tagging rule comprises:

determining and tagging a part of speech of each segmented word according to a mapping between a mapping between a character and a corresponding part of speech and a mapping between a speech and a corresponding part of speech in a general word dictionary library, and/or to a predetermined mapping relationship between a word and a corresponding part of speech and a predetermined mapping relationship between a word and a corresponding part of speech.

13. The method of claim 12, wherein the predetermined word segmentation rule comprises identifying the segmented word with having a part of speech tagged as noun using a pre-trained identification model such that the segmented words having parts of speech tagged as noun can be classified, wherein the identifying model is a conditional random field model.

14. The method of claim 11, wherein the step S3 comprises:

after the company name and/or product name contained in the social information are obtained, building a predetermined word segmentation tree according to an order and parts of speech of the segmented words of the social information and resolving the key point information corresponding to the social information based on the predetermined word segmentation tree.

15. The method of claim 14, wherein the predetermined word segmentation tree comprises multiple levels of nodes; a node of a first level corresponds to the social information, nodes of a second level correspond to segmented phrases of the social information obtained by segmenting the social information according to the order and parts of speech of the segmented words, and nodes of each following level behind the second level are obtained by dividing the segmented phrases of the previous level.

16. The method of claim 15, wherein the step S3 further comprises:

obtaining a node distance between a segmented word of a first predetermined part of speech and a segmented word of a second predetermined part of speech based on the predetermined word segmentation tree, obtaining a segmented word of the second predetermined part of speech having a shortest node distance from the segmented word of the first predetermined part of speech, and forming the key point information by the segmented word of the first predetermined part of speech and the obtained segmented word of the second predetermined part of speech according to the order thereof in the social information.

17. A non-transitory computer-readable storage medium with a system for identifying risk event based on social information stored thereon, which, when being executed by one or more processors, is capable of performing:
S1, obtaining social information released by various predetermined social accounts from a predetermined social server;
S2, analyzing the social information to obtain a company name and/or a product name contained in the social information;
S3, resolving the social information to obtain key point information after the company name and/or the product name contained in the social information is obtained; and
S4, identifying an information directing classification corresponding to the key point information using a pre-trained classifier, and thus sending the social information having a predetermined information directing classification and the social account releasing the social information to a predetermined terminal for reviewing, wherein the information directing classification comprises positive information and negative information, the classifier is a support vector classifier, and when being executed by the one or more processors, the system for identifying risk event based on social information stored thereon is further capable of performing:
obtaining a preset number of key point information samples of positive information and a preset number of key point information samples of negative information;
dividing all the key point information samples into a training set of a first ratio and a testing set of a second ratio;
training a predetermined support vector classifier using the training set and testing an accuracy of the trained support vector classifier using the testing set;
if the accuracy is greater than a preset accuracy, ending the training and using the trained support vector classifier as the classifier, otherwise, if the accuracy is less than the preset accuracy, increasing the number of the key point information samples of the positive information and the negative information respectively to repeat the training.

\* \* \* \* \*